(12) United States Patent
Hsu et al.

(10) Patent No.: US 10,329,124 B2
(45) Date of Patent: Jun. 25, 2019

(54) ELEVATOR WIRELESS POWER SUPPLY

(71) Applicant: OTIS ELEVATOR COMPANY, Farmington, CT (US)

(72) Inventors: Arthur Hsu, South Glastonbury, CT (US); Suman Dwari, Vernon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 162 days.

(21) Appl. No.: 15/243,422

(22) Filed: Aug. 22, 2016

(65) Prior Publication Data

US 2017/0057791 A1   Mar. 2, 2017

Related U.S. Application Data

(60) Provisional application No. 62/209,761, filed on Aug. 25, 2015.

(51) Int. Cl.
*B66B 9/02* (2006.01)
*B66B 11/04* (2006.01)
(Continued)

(52) U.S. Cl.
CPC ............ *B66B 11/0407* (2013.01); *B66B 7/00* (2013.01); *H02J 50/10* (2016.02)

(58) Field of Classification Search
CPC ......... B66B 11/0407; B66B 7/00; H02J 50/10
(Continued)

(56) References Cited

U.S. PATENT DOCUMENTS 5,141,082 A * 8/1992 Ishii ..................... B66B 11/0407
187/289
5,234,079 A   8/1993 Nomura
(Continued)

FOREIGN PATENT DOCUMENTS

DE   102012011230 A1   12/2013
JP        10147484        6/1998
(Continued)

OTHER PUBLICATIONS

Contactless Power Supply for Magnetically Levitated Elevator Systems Usings a SMC Hybrid Actuator, Published in Electrical Machines (ICEM), printed from http://ieeexplore.ieee.org/xpl/login.jsp?tp=&arnumber=6222010&url=http%3A%2F%2Fieeexplore.ieee.org%2Fxpls%2Fabs_all.jsp%3Farnumber%3D6222010 Jul. 1, 2015, 2 pages.
(Continued)

*Primary Examiner* — Jeffrey Donels
(74) *Attorney, Agent, or Firm* — Cantor Colburn LLP

(57) ABSTRACT

An elevator system may include an elevator car having an electrically powered car subsystem and a guide rail constructed and arranged to guide the elevator car along a hoistway and in a direction of travel. Primary windings of the system are positioned along the hoistway, and a permanent magnet assembly is coupled to the elevator car. Together, the primary windings and the permanent magnet assembly define a linear motor for imparting motion to the elevator car in response to a drive signal. A secondary winding assembly of the elevator system is coupled to the elevator car and is located adjacent to the permanent magnet assembly along the direction of travel. In operation, the secondary winding assembly generates a current to power the car subsystem.

7 Claims, 4 Drawing Sheets

(51) Int. Cl.
*H02J 50/10* (2016.01)
*B66B 7/00* (2006.01)

(58) Field of Classification Search
USPC ..................................................... 187/250
See application file for complete search history.

(56) References Cited

U.S. PATENT DOCUMENTS

| | | | | |
|---|---|---|---|---|
| 5,235,226 | A * | 8/1993 | Olsen | H02K 41/025 187/289 |
| 6,305,501 | B1 * | 10/2001 | Kahkipuro | B66B 11/0407 187/250 |
| 6,412,604 | B1 | 7/2002 | Schuster | |
| 7,019,421 | B1 | 3/2006 | Hall et al. | |
| 7,839,101 | B2 * | 11/2010 | Yu | H02P 25/06 318/135 |
| 9,150,116 | B2 * | 10/2015 | Matscheko | B60L 7/00 |
| 2010/0006401 | A1 | 1/2010 | Flury et al. | |

FOREIGN PATENT DOCUMENTS

WO 2014189492 A1 11/2014
WO 2015084367 A1 6/2015

OTHER PUBLICATIONS

International Search Report, International Application No. PCT/US2013/073311; International Filing Date Sep. 2, 2014, dated Sep. 2, 2014; 2 pages.

International Search Report; International Application No. PCT/US2013/041999; dated Feb. 12, 2014; 2 pages.

J.P.C. Smeets, et al., Comparison of Position-Independent Contactless Energy Transfer Systems, Power Electronics, IEEE Transactions on (vol. 28, Issue: 4), 2 pages.

R. Appunn, et al., "Modem High Speed Elevator Systems for Skyscrapers," Institute of Electrical Machines, RWTH Aachen University, Aachen, Germany, 15 pages.

* cited by examiner

ELEVATOR WIRELESS POWER SUPPLY

CROSS REFERENCE TO RELATED APPLICATION

This application claims priority to U.S. Provisional Application No. 62/209,761, filed Aug. 25, 2015, the entire contents of which is incorporated herein by reference.

BACKGROUND

The subject matter disclosed herein relates generally to the field of elevators, and more particularly, to a wireless power supply for an elevator system.

Self-propelled elevator systems, also referred to as ropeless elevator systems, are useful in certain applications (e.g., high rise buildings) where the mass of the ropes for a roped system is prohibitive and/or there is a need for multiple elevator cars in a single hoistway. Elevator cars typically need power for ventilation, lighting systems, control units, communication units and to recharge batteries installed, for example, on an elevator car controller. Existing systems use moving cables or current collectors/sliders to connect a moving elevator car with power lines distributed along the elevator hoistway.

SUMMARY

An elevator system according to one, non-limiting, embodiment of the present disclosure includes an elevator car arranged to travel along a hoistway, the elevator car including an electrically powered car subsystem; a propulsion system positioned along the hoistway for imparting motion to the elevator car, the propulsion system including a plurality of primary windings aligned along the hoistway; and a secondary winding assembly coupled to the elevator car and configured to generate a current to power the car subsystems when adjacent primary windings of the plurality of primary windings are electrically energized.

Additionally to the foregoing embodiment, the propulsion system includes an assembly coupled to the elevator car, and the plurality of primary windings and the assembly define a linear motor for imparting motion to the elevator car in a direction of travel.

In the alternative or additionally thereto, in the foregoing embodiment, the assembly is a permanent magnet assembly.

In the alternative or additionally thereto, in the foregoing embodiment, the primary windings are positioned between first and second secondary windings of the secondary winding assembly.

In the alternative or additionally thereto, in the foregoing embodiment, a pitch of coils of the secondary winding assembly does not match a pitch of coils of the primary windings.

In the alternative or additionally thereto, in the foregoing embodiment, the secondary winding assembly is co-axially aligned with the permanent magnet assembly.

In the alternative or additionally thereto, in the foregoing embodiment, the primary windings are provided with a first current profile when sequentially adjacent to the permanent magnet assembly and a different second current profile when sequentially adjacent to the secondary winding assembly.

In the alternative or additionally thereto, in the foregoing embodiment, the elevator car subsystem includes at least one of a battery, a ventilation unit, a lighting system, a control unit, and a communication unit.

In the alternative or additionally thereto, in the foregoing embodiment, the secondary winding assembly generates the current to power the elevator car subsystem in response to a first current profile of the primary windings when sequentially selected to transfer power to the elevator car, and wherein the first current profile is different than a second current profile of the primary windings applied when sequentially selected to propel the elevator car.

In the alternative or additionally thereto, in the foregoing embodiment, the elevator system includes a controller configured to sequentially control the primary windings and selectively apply the first and second current profiles.

In the alternative or additionally thereto, in the foregoing embodiment, the elevator system is ropeless.

In the alternative or additionally thereto, in the foregoing embodiment, the direction of travel is vertical.

In the alternative or additionally thereto, in the foregoing embodiment, the permanent magnet assembly has a vertical height that is greater than a vertical height of the secondary winding assembly.

In the alternative or additionally thereto, in the foregoing embodiment, the permanent magnet assembly is spaced vertically from the secondary winding assembly.

In the alternative or additionally thereto, in the foregoing embodiment, the permanent magnet assembly is disposed above the secondary winding assembly.

In the alternative or additionally thereto, in the foregoing embodiment, the elevator system includes a rectifier disposed in the elevator car and configured to convert the generated electrical current to DC current.

A wireless power supply for an elevator car including a linear motor for imparting vertical motion to the elevator car in a hoistway, the linear motor including a permanent magnet assembly coupled to the elevator car for magnetic levitation, the wireless power supply according to another, non-limiting, embodiment includes a plurality of primary windings distributed along the hoistway; a first secondary winding engaged to the elevator car; and a second secondary winding engaged to the elevator car, and wherein the plurality of windings are disposed between the first and second secondary windings, and the first and second secondary windings are configured to generate a current to power a car subsystem.

Additionally to the foregoing embodiment, the car subsystem includes at least one of a battery, a ventilation unit, a lighting system, a control unit and a communication unit.

In the alternative or additionally thereto, in the foregoing embodiment, the first and second secondary windings generate the current to power the elevator car subsystem in response to a current profile dedicated for inductive power transfer.

In the alternative or additionally thereto, in the foregoing embodiment, the plurality of primary windings are configured to be energized at a first frequency for elevator car propulsion and a second frequency for power transfer, and the second frequency being greater than the first frequency.

In the alternative or additionally thereto, in the foregoing embodiment, the second frequency is greater than 1 kHz.

In the alternative or additionally thereto, in the foregoing embodiment, the first and second secondary windings are disposed at least one primary module length away from the permanent magnet assembly.

The foregoing features and elements may be combined in various combinations without exclusivity, unless expressly indicated otherwise. These features and elements as well as the operation thereof will become more apparent in light of the following description and the accompanying drawings.

However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

The following patent applications assigned to the same assignee and filed on the same day as the present disclosure are herein incorporated by reference in their entirety.

Figure 1:
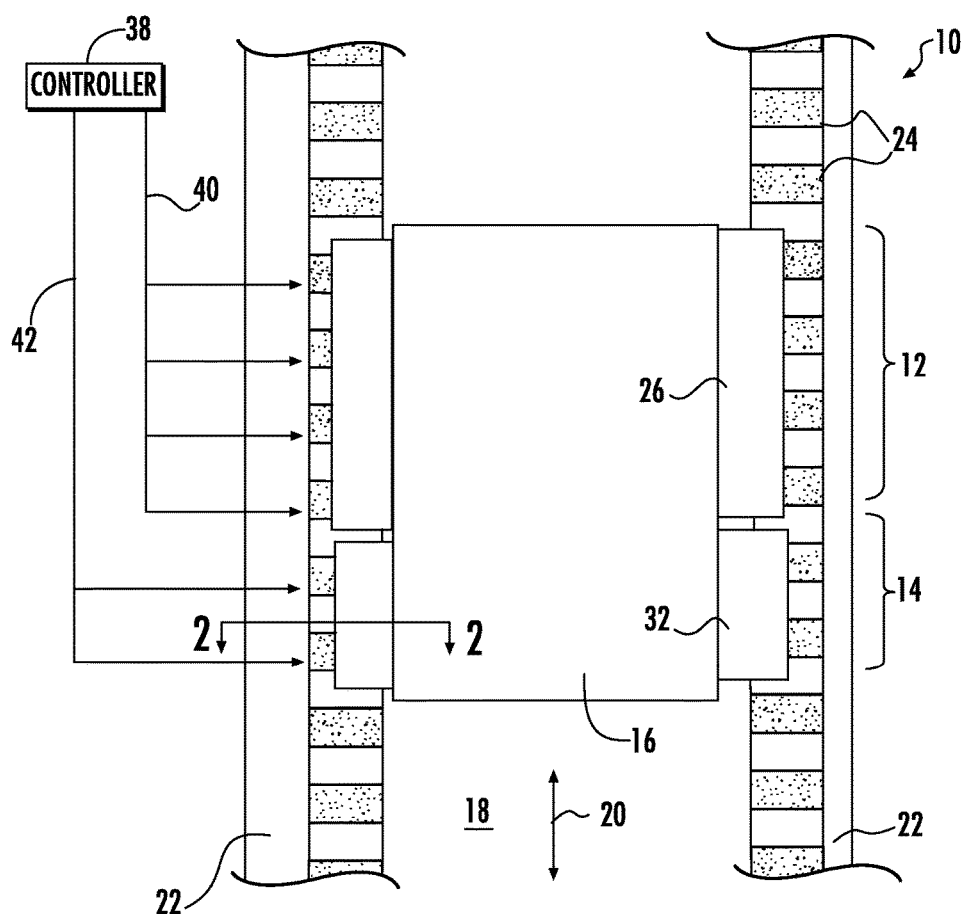
FIG. 1 depicts an elevator system having a wireless power supply in an exemplary embodiment.

FIG. 1 depicts an elevator system 10 in an exemplary embodiment that may be ropeless. The elevator system 10 includes a propulsion system 12 that may be a linear motor, a wireless power supply 14 and an elevator car 16 that travels in a hoistway 18 along a travel direction (see arrow 20) that may be substantially vertical. Elevator car 16 travels along one or more guide rails 22 extending along the length of hoistway 18. The linear motor 12 includes primary windings 24 provided along guide rails 22 and a permanent magnet assembly 26 engaged to the elevator car 16. Primary windings 24 include a plurality of coils that may be coupled to the guide rails 22. Each guide rail 22, on either side of elevator car 16, may include primary windings 24. The primary windings 24 serve as stator windings of the linear motor 12 to impart motion to elevator car 16. Primary windings 24 may be electrically arranged in three phases. Primary windings 24 may be located separate from guide rails 22 in exemplary embodiments. According to further exemplary embodiments, windings 24 may be used as guide rails 22 or incorporated into the guide rails 22. According to an exemplary embodiment a single stator may be used instead of multiple stators. Further, multiple stators may be configured on opposite sides of an elevator car 16 as shown in FIG. 1, or they may have different configurations, for example, multiple stators may be positioned adjacent a single side of the elevator car 16.

Figure 2:
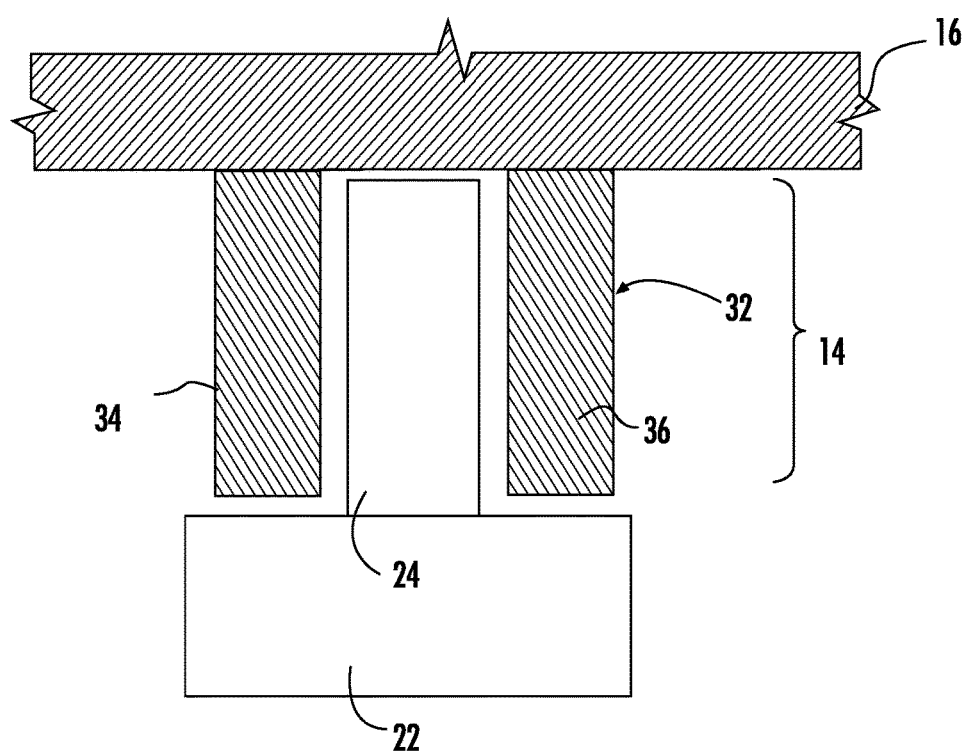
FIG. 2 is a top down view of a car and portions of the wireless power system of the elevator system in an exemplary embodiment.
Figure 3:
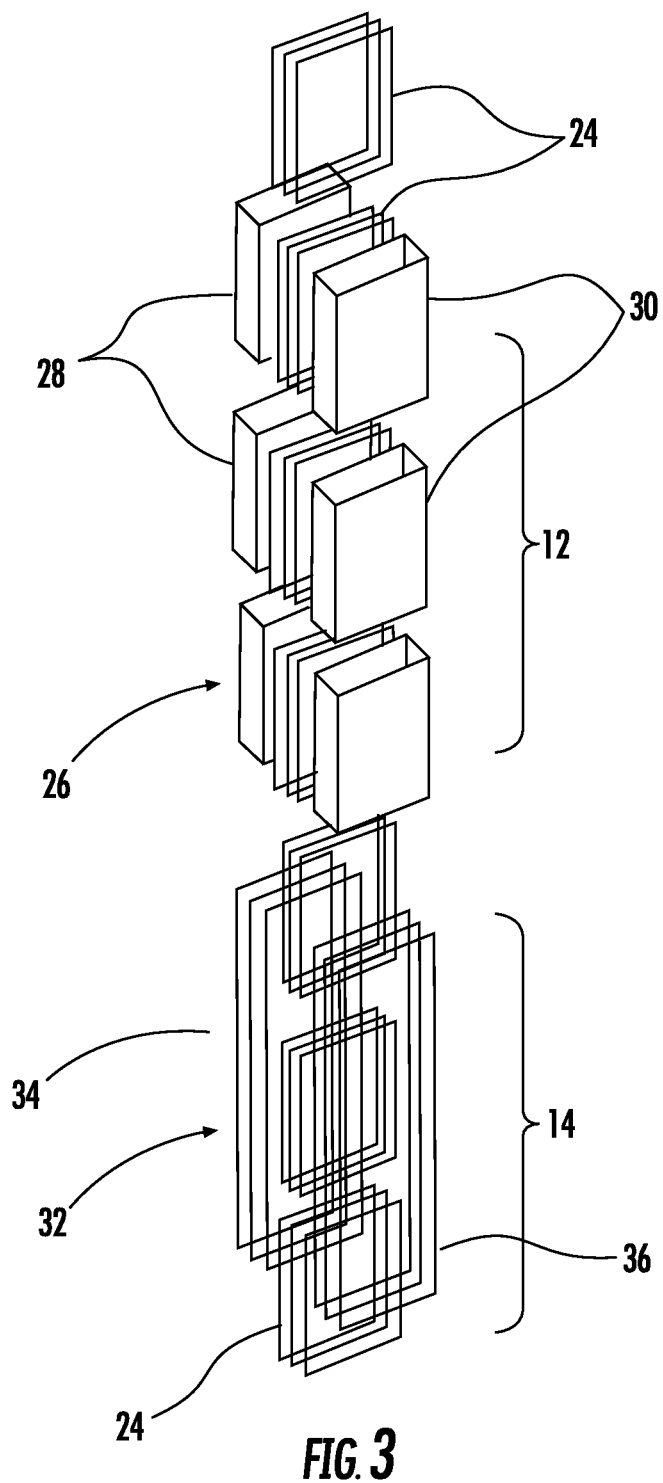
FIG. 3 is a perspective view of the elevator system with portions removed to show internal detail.

Referring to FIGS. 1 through 3, the guide rail 22 may support the primary windings 24. Coils of the primary windings 24 may be formed about ferromagnetic cores. The permanent magnet assembly 26 may include a first and a second plurality of magnets 28, 30 each mounted to elevator car 16, and are positioned on opposite sides of the primary windings 24. The primary windings 24 and the permanent magnet assembly 26 form a permanent magnet synchronous motor to impart motion to elevator car 12. The primary windings are configured to generate a magnetic flux that imparts a force on the permanent magnet assembly 26 to control movement of the elevator car 16 (e.g., moving up, down, or holding still).

The wireless power supply 14 includes a secondary winding assembly 32 mounted to the elevator car 16, inductively coupled with one or more coils of the primary windings 24, and generally spaced from (e.g., above or below) the permanent magnet assembly 26 along the car travel direction 20. The secondary winding assembly 32 may include first and second secondary windings 34, 36 with at least one of the primary windings 24 disposed therebetween. The first secondary winding 34 may be co-axially aligned with the first plurality of magnets 28, and the second secondary winding 36 may be co-axially aligned with the second plurality of magnets 30. The height of the first and second secondary windings 34, 36 (i.e., taken along direction 20) may be different in size (e.g., substantially greater in height) when compared with any one coil of the primary windings 24. It is further contemplated and understood that the first and second secondary windings 34, 36 may each include more than one coil (not shown), and each having a pole pitch that need not match the pole pitch of the coils of the primary windings 24. Moreover, there may only be one set of secondary windings, and/or the primary windings 24 may not be disposed between two sets of secondary windings and instead may be in proximity thereto.

More specifically, and as one non-limiting example, three primary phases (i.e., phases A, B and C associated with respective three adjacent coils of the primary windings 24) may be excited with balanced currents or with currents which have instantaneous summation that is equal to zero, and the secondary windings 34, 36 may respectively span across a pole pitch over the three adjacent coils of the primary windings 24. In such a configuration, the observed magnetic flux by the secondary windings 34, 36 may be near zero without regard to the excitation frequency of the primary coil; and hence, no power may be inductively transferred to the secondary coil. However, if the excitation in the primary phases (i.e. A, B and C) are not balanced or their instantaneous summation is not zero, or only a subset of primary phases (e.g., phases A and B) is excited, or the secondary windings 34, 36 is a smaller coil pitch, then the net magnetic flux observed on the secondary coils will not be zero, which would facilitate inductive power transfer. Regardless of secondary coil pole pitch with respect to the primary coils and because of the undesired effects of force pulsation created by secondary coil, the excitation frequency applied for power transfer may be substantially higher (e.g., greater than 1 kHz) than the excitation frequency for the elevator car propulsion.

If all the coils in the primary phases (i.e., A, B and C) are simultaneously excited when the primary windings 24 are also sequentially used for elevator car propulsion, it may be desirable for the secondary windings 34, 36 to be at least a primary module length (e.g., 1.3 meters) away from the permanent magnet assembly 26. It is further contemplated and understood that the primary windings 24 may be dedicated for power transfer with other primary windings dedicated for elevator car propulsion. With this alternative, the secondary windings 34, 36 need not be at least a primary module length away from the permanent magnet assembly.

A controller 38 provides a sequential first drive signal (see arrows 40 in FIG. 1) to the primary windings 24 of the linear motor 12 to impart motion to the elevator car 16 via the permanent magnet assembly 26. In addition, the controller 38 also provides a sequential second drive signal (see arrows 42) to the primary windings 24 to provide inductive power to the elevator car 16 via the secondary winding assembly 32. Controller 38 may be implemented using a general-purpose microprocessor executing a computer program stored on a storage medium to perform the operations described herein. Alternatively, controller 38 may be implemented in hardware (e.g., ASIC, FPGA) or in a combination of hardware/software. Controller 38 may also be part of an elevator control system. Controller 38 may include power circuitry (e.g., an inverter or drive) to sequentially power the primary windings 24. It is further contemplated and understood that the controller may be implemented as a plurality of separate units with specific functions.

Figure 4:
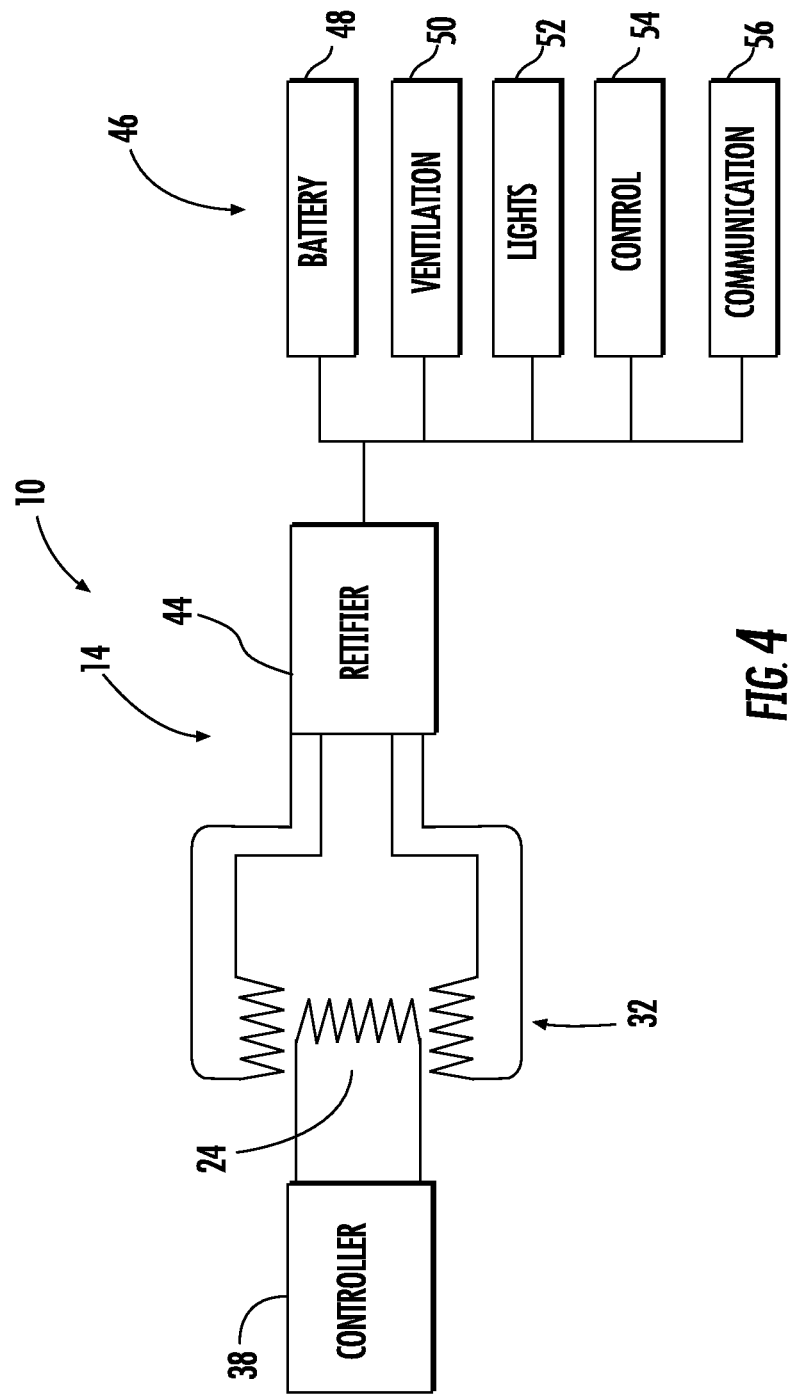
FIG. 4 is a schematic diagram of the wireless power supply of the elevator system.

Referring to FIGS. 1 and 4, a high level schematic diagram of the elevator system 10 is illustrated. Controller 38 may provide the drive signal 42 (e.g., three-phase) to the selected primary winding(s) 24. When a selected primary winding 24 receives the drive signal 42, the same winding does not receive the drive signal 40 that is indicative of propulsion. More specifically, the drive signal 40 associated with car propulsion may have a different current profile that the drive signal 42 associated with inductive power transfer. Therefore, the controller 38 may be configured to be cognizant, not only of the location of the car 16 in the hoistway 18, but of the position of the permanent magnet assembly 26 and the position of the secondary winding assembly 32 (i.e. positions relative to one-another). In this way, the primary windings 24 may be dual functioning and thus re-used for both assemblies 26, 32. For example, the excitation frequency for the propulsion may be in the range of 0 Hz to 100 Hz while the wireless power transfer frequency may be in the range of 1 kHz to 250 kHZ.

The wireless power supply 14 may further include a rectifier 44 connected to the secondary winding assembly 32. The rectifier 44 may convert alternating current (AC) from the secondary winding assembly 32 to direct current (DC). An output of rectifier 44 may be provided to one or more electrically powered car subsystems 46. Non-limiting examples of car subsystems 46 may include a battery 48, ventilation unit 50, lighting system 52, control unit 54 and communication unit 56. It is understood that the rectifier 44 may provide power to a variety of elevator car subsystems, and the components in FIG. 4 are exemplary. According to further exemplary embodiments, the output of rectifier 44 may be stored locally in the battery 48 on the elevator car 16 for use as emergency power.

Embodiments of the present disclosure enable wireless energy transfer to a moving elevator car of elevator systems that may be self-propelled. This eliminates the need for moving cables or current collectors/sliders for connecting a moving elevator car with power lines distributed along the elevator hoistway. The embodiments further provide low-cost solution that re-uses the linear motor primary windings typically dedicated for propulsion. Concerns such as primary infrastructure alignment and local activation are inherently resolved.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An elevator system comprising:
   an elevator car arranged to travel along a hoistway, the elevator car including an electronically powered car subsystem;
   a propulsion system positioned along the hoistway for imparting motion to the elevator car, the propulsion system including a plurality of primary windings aligned along the hoistway; and
   a secondary winding assembly coupled to the elevator car and configured to generate a current to power the car subsystems when adjacent primary windings of the plurality of primary windings are electronically energized, wherein the propulsion system includes an assembly coupled to the elevator car, and the plurality of primary windings and the assembly define a linear motor for imparting motion to the elevator car in a direction of travel, wherein the assembly is a permanent magnet assembly, and wherein the primary windings are provided with a first current profile when sequentially adjacent to the permanent magnet assembly and a different second current profile when sequentially adjacent to the secondary winding assembly.

2. An elevator system comprising:
   an elevator car arranged to travel along a hoistway, the elevator car including an electronically powered car subsystem;
   a propulsion system positioned along the hoistway for imparting motion to the elevator car, the propulsion system including a plurality of primary windings aligned along the hoistway; and
   a secondary winding assembly coupled to the elevator car and configured to generate a current to power the car subsystems when adjacent primary windings of the plurality of primary windings are electronically energized, wherein the propulsion system includes an assembly coupled to the elevator car, and the plurality of primary windings and the assembly define a linear motor for imparting motion to the elevator car in a direction of travel, wherein the assembly is a permanent magnet assembly, wherein the direction of travel is vertical, and wherein the permanent magnet assembly has a vertical height that is greater than a vertical height of the secondary winding assembly.

3. The elevator system set forth in claim 2, wherein the permanent magnet assembly is spaced vertically from the secondary winding assembly.

4. The elevator system set forth in claim 3, wherein the permanent magnet assembly is disposed above the secondary winding assembly.

5. A wireless power supply for an elevator car including a linear motor for imparting vertical motion to the elevator car in a hoistway, the linear motor including a permanent magnet assembly coupled to the elevator car for magnetic levitation, the wireless power supply comprising:
   a plurality of primary windings distributed along the hoistway;
   a first secondary winding engaged to the elevator car; and
   a second secondary winding engaged to the elevator car, and wherein the plurality of primary windings are disposed between the first and second secondary windings, and the first and second secondary windings are configured to generate a current to power a car subsystem, wherein the plurality of primary windings are configured to be energized at a first frequency for elevator car propulsion and a second frequency for power transfer, and the second frequency being greater than the first frequency.

6. The wireless power supply set forth in claim 5, wherein the second frequency is greater than 1 kHz.

7. The wireless power supply set forth in claim 5, wherein the first and second secondary windings are disposed at least one primary module length away from the permanent magnet assembly.

* * * * *